Aug. 25, 1936.  F. P. WILSLEF  2,052,065
HITCHING DEVICE
Filed June 18, 1934
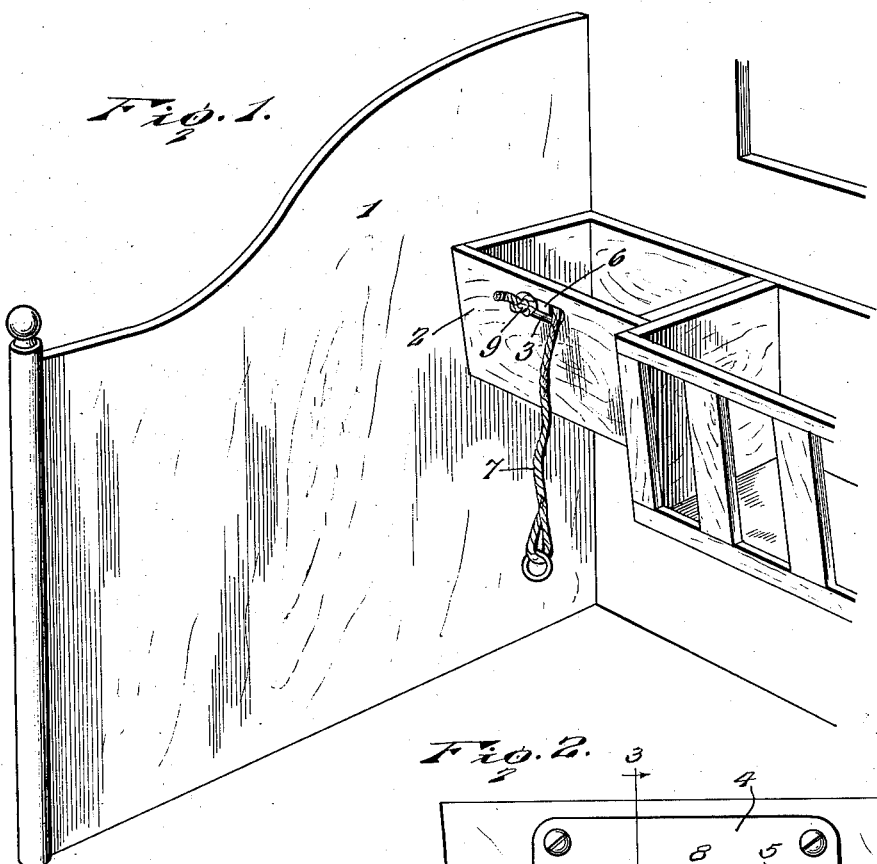
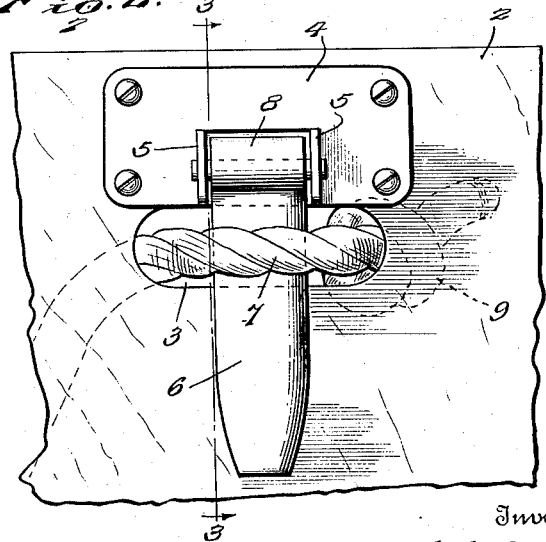
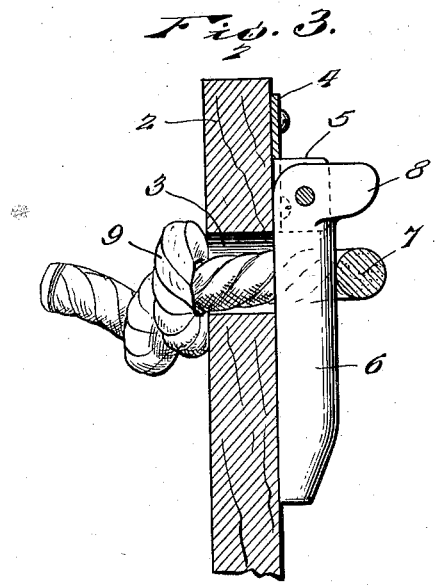
Inventor
F. P. Wilslef.
By Lacy & Lacy,
Attorneys Patented Aug. 25, 1936

2,052,065

UNITED STATES PATENT OFFICE 2,052,065

HITCHING DEVICE

Ferdinand P. Wilslef, Dewitt, Iowa

Application June 18, 1934, Serial No. 731,209

1 Claim. (Cl. 119—110)

This invention seeks to provide a very simple and inexpensive, but efficient device, whereby live stock may be securely hitched and quickly released when desired. The invention is illustrated in the accompanying drawing and will be hereinafter fully described, the novel features being particularly defined in the appended claim.

In the annexed drawing:

Figure 1 is a perspective view of a portion of a stall having my invention applied thereto.

Figure 2 is a rear elevation on a larger scale.

Figure 3 is a section on the line 3—3 of Figure 2.

In the drawing, the reference numeral 1 indicates a partition or side wall of a stall at one end of which is a manger 2. According to the present invention, the front wall of the manger has an opening 3 formed therein which is preferably elongated to form a slot somewhat below but parallel with the upper edge of the manger. On the inner side of the slotted wall, a bracket 4 is secured immediately above the slot or opening 3, as shown most clearly in Figure 2, and on this bracket are spaced lugs or ears 5 to and between which is pivoted the upper end of a latch 6. As shown clearly in Figures 2 and 3, the latch is of such length as to extend across the opening or slot 3 and an appreciable distance below the slot so that it will normally lie against the wall of the manger and thereby prevent release or withdrawal of a halter rope, such as 7, which may be passed through the slot and around the latch. The latch is provided at its upper end with a rearwardly projecting lateral lug or head 8, which, when the latch is raised, will abut the wall of the manger or the plate 4 so that the upward movement of the latch will be limited and it will be stopped in such position that when released its weight will cause it to drop and extend across the opening or slot 3. The hitching or halter rope 7 may be an extension of the halter of the animal or may be engaged with the halter, but in either event, an end portion thereof is formed into a bight which is passed through the slot 3 and engaged around the latch, as clearly shown in Figures 2 and 3, so that a pull upon the rope will merely hold the latch more firmly against the wall of the manger and withdrawal of the rope will be prevented, a knot 9 being formed in the rope adjacent its end so that the knotted end cannot be drawn through the slot. It will, of course, be entirely within the scope of the invention to apply any other form of abutment instead of the knot 9 so that the passage of the end of the rope through the slot will be prevented. When an animal is to be hitched in the stall, the hitching rope 7 is engaged with the halter upon the animal's head and then a bend or bight is formed in the rope near the end thereof and this bight is inserted through the slot 3 with a sufficient length of the rope to permit the latch to clear the rope as it is swung downward. The latch is, of course, raised when the rope is being inserted, and it will remain raised until a sufficient length of the rope has been passed through the slot to clear the end of the latch whereupon the latch will drop and any pull upon the rope will then serve to more effectually restrain the animal. The head or lug 8 furnishes a finger piece whereby the operator may readily swing the latch into its raised position or the turning of the latch may be left to the push exerted thereon by the inserted rope.

The device is exceedingly simple and inexpensive and may be readily manipulated to quickly secure or release an animal.

Having thus described the invention, I claim:

In a device of the class described, a bracket adapted to be mounted on a wall above a slot formed in said wall, said bracket having ears struck medially therefrom, a latch swingably connected with the bracket between the ears and having a lateral lug at one end thereof, said lateral lug being adapted for disposition between the ears, and means swingingly connecting the latch with the ears, said latch being adapted to extend across the slot and through a loop extending through the slot whereby removal of the loop will be prevented while the latch is in position, said lug being adapted to abut the bracket when the latch is swung open for limiting swinging movement of the bracket.

FERDINAND P. WILSLEF.